Figure 1:
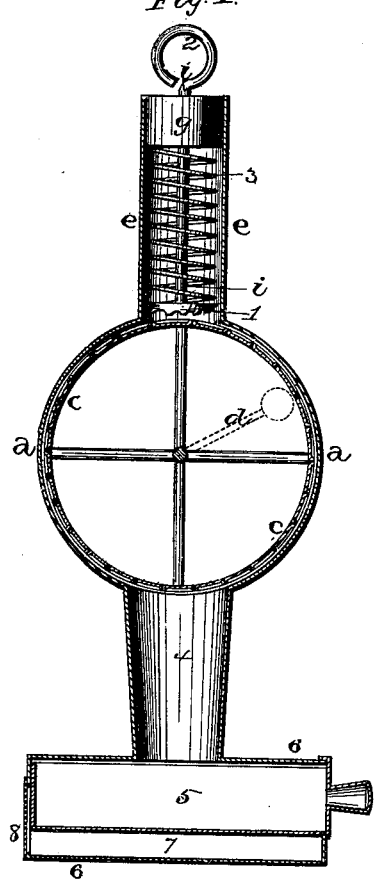
Figure 2:
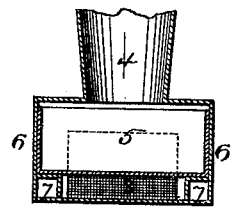

J. MEYER.
NUTMEG GRATER.

No. 189,375. Patented April 10, 1877.

WITNESSES:
J. W. Garner
Albert J. de Joyl

INVENTOR:
Jno. Meyer
per
F. A. Lehmann, Atty.

UNITED STATES PATENT OFFICE.

JOHN MEYER, OF WASHINGTON COURT-HOUSE, OHIO.

IMPROVEMENT IN NUTMEG-GRATERS.

Specification forming part of Letters Patent No. 189,375, dated April 10, 1877; application filed March 17, 1877.

*To all whom it may concern:*

Be it known that I, JOHN MEYER, of Washington Court-House, in the county of Fayette and State of Ohio, have invented certain new and useful Improvements in Nutmeg-Graters; and I do hereby declare the following to be a full, clear, and exact description of the invention, such as will enable others skilled in the art to which it pertains to make and use it, reference being had to the accompanying drawings, which form part of this specification.

My invention relates to an improvement in nutmeg-graters; and it consists in the arrangement and combination of parts, that will be more fully described hereinafter, whereby a grater and a sifter are combined in a single implement.

The accompanying drawings represent my invention.

$a$ represents the circular body, in which the revolving grater $c$ is placed, and turned by the handle $d$. Upon the top of this body is placed the tube $e$, in which the nutmeg is placed to be grated. The cover $g$ of this tube is made to fit tightly in its top, and passing down through this cover is the rod $i$, which has a follower, 1, on its lower end to press down upon the nutmeg, and a ring, 2, on its upper end to serve as a handle. Placed between the top of the follower and the inside of the cover is a coiled spring, 3, which holds the nut pressed down upon the grater, so that all the operator has to do is to turn the handle $d$. As the nut is grated it falls down through the tube 4 into the drawer 5, placed in the compartment 6 below. From this drawer the grated nut can be emptied at will. This drawer is raised above the bottom of the compartment 6 by the pieces 7 on each side, so that it shall in nowise interfere with the wire-netting 8, placed in the back of the compartment.

When it is desired to sift the grated nut over any article, a portion of the nut is allowed to fall in the bottom of the compartment, or is poured therein from the drawer, the drawer returned to its place, and then the nut can be sifted at will.

When a sifter is not combined with the grater, either a separate sifter must be procured or the grated nut will contain many broken parts that are entirely too large to be used.

I am aware that a rotary grater is not new, and this I disclaim.

Having thus described my invention, I claim—

1. In a spice-grater, the chute 4, leading to the compartment 6, the latter being provided with the side pieces 7, to support the drawer and leave a space beneath it, as and for the purpose set forth.

2. As a new article of manufacture, the improved spice-grater shown, consisting of the grating mechanism $a$ $c$ $e$, the chute 4, compartment 6, having the drawer 5, and provided with a sifting-cloth, 8, as and for the purpose described.

In testimony that I claim the foregoing I have hereunto set my hand this 12th day of March, 1877.

JOHN MEYER.

Witnesses:
J. R. SUTHERLAND,
J. B. PRIDDY.